US012808464B2

(12) United States Patent
Holst et al.

(10) Patent No.: US 12,808,464 B2
(45) Date of Patent: Nov. 24, 2026

(54) FLEXIBLE HOSE, MORE PARTICULARLY VACUUM CLEANER HOSE, METHOD FOR PRODUCTION OF SAME AND DEVICE WHICH CAN BE USED THEREFOR

(71) Applicant: Truplast Kunststofftechnik GmbH, Langgöns (DE)

(72) Inventors: Marco Holst, Bensheim (DE); Dirk Schwan, Langgöns (DE); Ingo Steitz, Staufenberg (DE)

(73) Assignee: TRUPLAST Kunststofftechnik GmbH, Langgöns (DE)

( * ) Notice: Subject to any disclaimer, the term of this patent is extended or adjusted under 35 U.S.C. 154(b) by 569 days.

(21) Appl. No.: 18/249,485

(22) PCT Filed: Oct. 22, 2021

(86) PCT No.: PCT/EP2021/079433
§ 371 (c)(1),
(2) Date: Apr. 18, 2023

(87) PCT Pub. No.: WO2022/084549
PCT Pub. Date: Apr. 28, 2022

(65) Prior Publication Data
US 2023/0383872 A1 Nov. 30, 2023

(30) Foreign Application Priority Data
Oct. 22, 2020 (DE) ..................... 10 2020 006 493.0

(51) Int. Cl.
*F16L 11/118* (2006.01)
*A47L 9/24* (2006.01)
(Continued)

(52) U.S. Cl.
CPC ............. *F16L 11/1185* (2013.01); *A47L 9/24* (2013.01); *B29C 53/78* (2013.01); *F16L 11/081* (2013.01)

(58) Field of Classification Search
CPC ....... F16L 11/1185; F16L 11/081; A47L 9/24; B29C 53/78
(Continued)

(56) References Cited

U.S. PATENT DOCUMENTS 4,108,701 A * 8/1978 Stanley ................. F16L 11/127 156/244.15
5,416,270 A * 5/1995 Kanao .................. F16L 11/1185 174/114 R
(Continued)

FOREIGN PATENT DOCUMENTS

DE 29602061 U1 3/1996
DE 202009016596 U1 4/2010
(Continued)

OTHER PUBLICATIONS

German Office Action, Serial No. 10 2020 006 493.0, Applicant: Truplast Kunststofftechnick Gesellschaft mit beschrankter Haftung, Dated: Jun. 16, 2021.
(Continued)

*Primary Examiner* — David R Deal
(74) *Attorney, Agent, or Firm* — Reising Ethington, P.C.

(57) ABSTRACT

A flexible hose (10), for a vacuum cleaner, has a wall (12), an inner side (14) of which delimiting a cavity (16) for conveying media and at least one outer side (18) of which having a profiling (20) which has, in section, seen along a longitudinal axis (22) of the hose, elevations (24) and depressions (26). On the outer side of the wall, at least one electrically conductive track (28) is provided which extends around the wall and is in electrical contact with at least one
(Continued)

electrically conductive thread (30) which electrically connects ends of the hose facing away from one another. The electrically conductive thread is fastened to the outer side in a manner extending substantially along the longitudinal axis of the hose and transverse to the electrically conductive track.

22 Claims, 7 Drawing Sheets

(51) Int. Cl.
*B29C 53/78* (2006.01)
*F16L 11/08* (2006.01)

(58) Field of Classification Search
USPC .......................................................... 138/118
See application file for complete search history.

(56) References Cited

U.S. PATENT DOCUMENTS

| | | | | |
|---|---|---|---|---|
| 5,735,986 A | | 4/1998 | Fell | |
| 5,944,059 A | | 8/1999 | Masui | |
| 2007/0144756 | A1 * | 6/2007 | Wenger | F16L 11/127 174/47 |
| 2010/0089479 | A1 * | 4/2010 | Smith | F16L 11/16 138/119 |
| 2022/0205563 | A1 * | 6/2022 | Okura | F16L 11/112 |

FOREIGN PATENT DOCUMENTS

| | | | |
|---|---|---|---|
| DE | 202017107890 | U1 | 5/2018 |
| DE | 102016109967 | B4 | 1/2020 |
| EP | 2378174 | A1 | 10/2011 |
| WO | 9716304 | A1 | 5/1997 |
| WO | 2005047748 | A1 | 5/2005 |
| WO | 2012160524 | A1 | 11/2012 |
| WO | 2020209352 | A1 | 10/2020 |

OTHER PUBLICATIONS

PCT International Search Report, Int. Application No. PCT/EP2021/079433, Applicant: Truplast Kunststofftechnik GmbH, Dated: Jan. 28, 2022.

PCT Preliminary Report on Patentability, Int. Application No. PCT/EP2021/079433, Int. Filing Date: Oct. 22, 2021, Applicant: Truplast Kunststofftechnik GmbH, Dated: May 4, 2023.

Chinese First Office Action, Application No. 202180087029.6, Dispatching Serial No. 2025051501551580, Applicant: Truplast Kunststofftechnik GMBH, Dated: May 15, 2025.

* cited by examiner

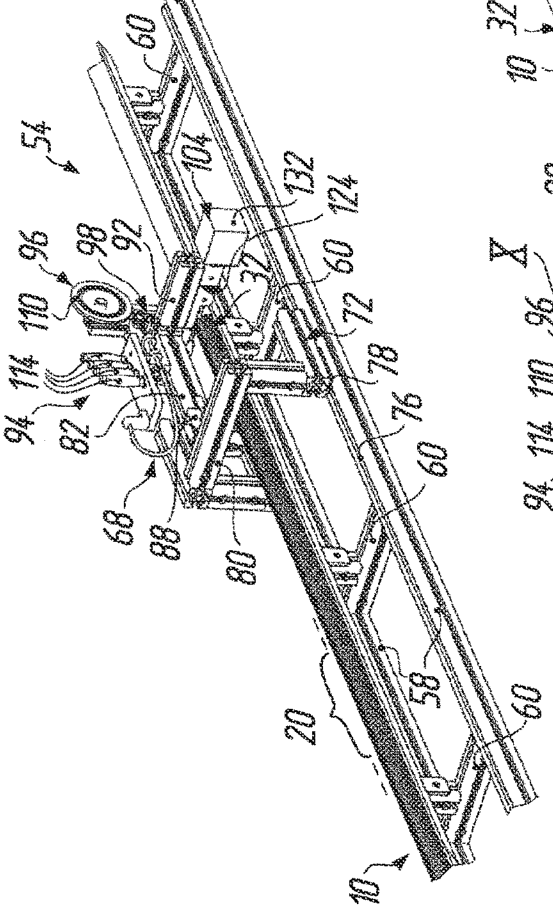
FIG. 7
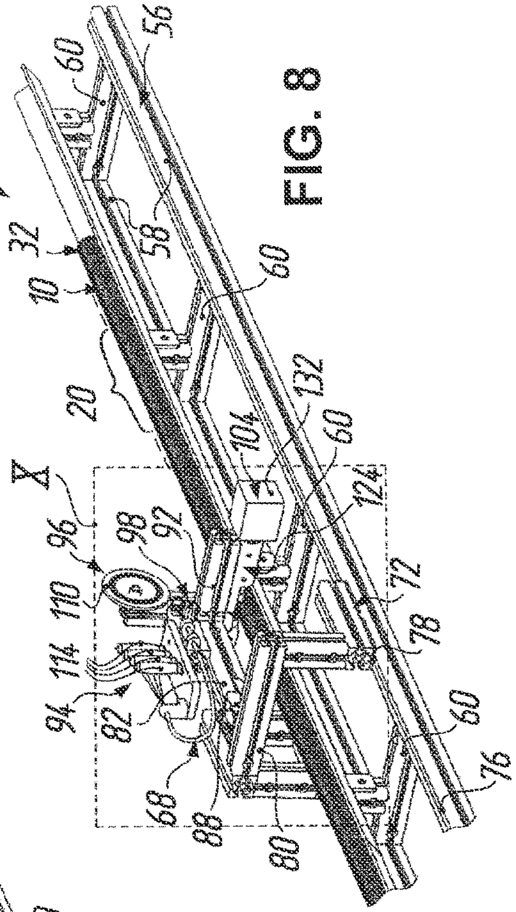
FIG. 8
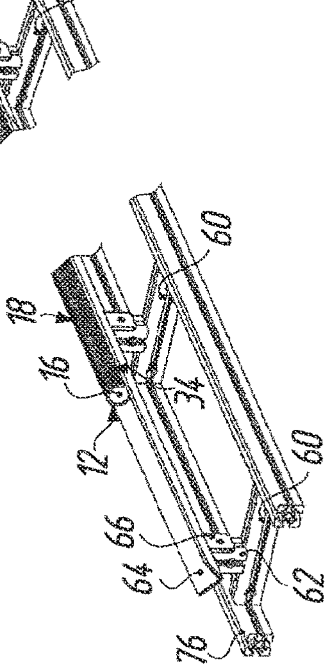
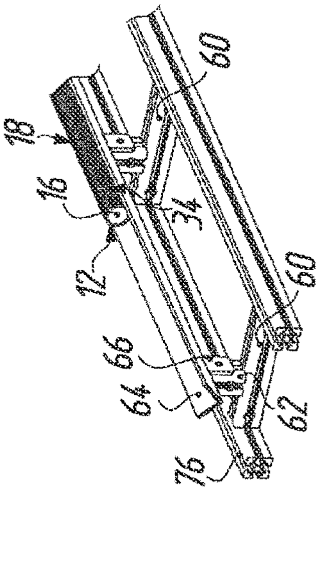

FLEXIBLE HOSE, MORE PARTICULARLY VACUUM CLEANER HOSE, METHOD FOR PRODUCTION OF SAME AND DEVICE WHICH CAN BE USED THEREFOR

TECHNICAL FIELD

The present invention relates to a flexible hose according to the preamble portion of claim 1 as well as to a method for production of such a hose in large quantities and to a device usable for that purpose. In particular, the invention relates to a flexible vacuum cleaner hose and the production thereof, such as used on a large scale in an industrial environment, in trades and in private households.

BACKGROUND OF THE INVENTION AND PRIOR ART

In the suction or conveying of very fine particles by a hose made from a plastics material, such as, for example, polyethylene (PE), polypropylene (PP) or an ethylene vinyl acetate co-polymer (EVAC), for example by a vacuum cleaner, strong electrostatic charges are generated by the friction of the particles against the walls of the hose. These can abruptly discharge, sometimes even with formation of sparks, in the event of, for example, contact of the electrically charged suction hose with an earthed component or user. The discharges can be of such strength that damage occurs at electronic apparatus and/or discomfort or some possible other risk is triggered at the user.

Moreover, spark discharges can ignite explosive dust/air mixtures, gas/air mixtures and solvent-vapor/air mixtures. A risk of electrostatic ignition can in that case arise not only from the charged conveyed material, but also from charged components of a vacuum cleaner, particularly the suction hose.

Such sudden discharges can be prevented if all parts, which conduct the particles, of the vacuum cleaner are electrically connected with one another for potential equalization and with a protective conductor of the associated electrical connector.

Against this background, use is increasingly made of suction hoses made from a highly resistive, electrically conductive material, for example PE, in which fine carbon particles are embedded, for suction of fine dusts. However, this material is expensive by comparison with pure PE and, moreover, leaves behind undesired abrasion tracks if the suction hose is drawn by its outer circumferential surface over a substrate. These abrasion tracks can be prevented by an additional protective layer applied to the outer circumference of the hose, but this is connected with additional cost and makes the suction hoses more expensive.

In order to create a remedy it has been proposed in document DE 20 2009 016 596 U1 to use a coiled suction hose of an economic basic material at which is provided at least one electrical conductor, which extends substantially over the coil length of the suction hose, for dissipation of electrostatic charge, wherein the electrical conductor has a width at most equal to the channel width of the suction hose. This electrical conductor can be formed as, for example, a plastics material layer with an embedded carbon component, as an electrically conductive wire extending helically or as an electrically conductive strip. With respect to the position of the electrical conductor, it can be inferred from this prior art that the electrical conductor is either embedded in the material of the suction hose or arranged at the inner side of the base of the helix channel, at the outer side of the base of the helix channel or inwardly or outwardly at the webs bounding the helix channel.

Document DE 296 02 061 U1 discloses a further electrically dissipative hose with helically extending wave crests and wave valleys adjacent thereto at its outer side. An outwardly stripped electrical conductor consisting of an uninsulated wire suitable for dissipation of electrostatic charges is deposited in the wave valleys. The electrical conductor is covered by a strip which consists of thermoplastic material and the longitudinal edges of which are fastened to the flanks of the wave crests by welding or glueing.

Further, in order to enable, in particular, improved dissipation of electrical charges by comparison with the afore-described hoses, which comprise a "single electrically conductive device", a conveying hose has been proposed in document WO 2005/047748 A1, in which a combination of "two electrically conductive devices" for conducting away electrical charges is provided. One electrically conductive device is a region, which concentrically surrounds the interior of the hose and is bounded by the inner surface, of the hose wall, which through embedding of electrically conductive particles in the basic material is furnished with an electrical conductivity significantly increased by comparison with the basic material. The other electrically conductive device is a local electrical conductor element which extends in axial direction and which is directly connected with the region of increased electrical conductivity and is to conduct away charges, which are collected by this region, to ground.

In the case of the pressure hoses according to this prior art the two electrically conductive devices are directly embedded in the hose wall during extrusion or co-extrusion of the respective pressure hose, so that a one-part ready-to-use pressure hose is created in one work step.

On the other hand, a widely used practice, which is particularly preferred with respect to a satisfactory capability of maintaining shape under an internally prevailing vacuum, for producing flexible suction hoses consists of initially extruding a profile of a plastics material, which is then wound helically or spirally, wherein adjacent coils or windings of the profiles are welded or glued together. In this connection, for example, document WO 2012/160524 A1 discloses a flexible plastics material hose produced by winding an extruded profile, wherein electrical conductors can also be embedded in the profile during extrusion of the profile.

Finally, a flexible hose having an outer wall produced from a plurality of windings of an extruded and helically wound profile is known from document DE 20 2017 107 890 U1, which defines the preamble portion of claim 1. Adjacent windings of the profile are connected together by a seam, wherein the outer wall has an electrically conductive track which contains a conductive section of the extruded and helically wound profile and/or the seam. In that case, the conductive section consists of an electrically conductive plastics material. The electrically conductive track additionally contains an electrically conductive thread, which at the outer wall of the hose is in electrical contact with the conductive section of the extruded and helically wound profile and/or the seam and, in particular, is embedded in the seam or in a groove provided in the profile. This electrically conductive thread is thus similarly a helically-wound integral component of the finished suction hose.

A disadvantage of the previously known electrically dissipative flexible hoses with "doubled dissipation" resides in the fact that for a good electrical dissipation capability of the hose a comparatively large amount of electrically conductive materials has to be provided in the hose, which materials due to integration thereof in the hose are also very difficult to recover, if at all.

What is desired is to have a flexible hose, particularly a vacuum cleaner hose, that has a good dissipation capability for electrostatic charges, yet the problems discussed above in this connection with respect to the prior art are addressed. In particular, the electrically dissipative flexible hose with use of a comparatively small amount of electrically conductive materials shall have improved suitability for recycling. What is further desired is a method for production of such an electrically dissipative flexible hose and a device for application of an electrically conductive thread to such a hose, which enables production or partial making-up—which is as simple, quick and economic as possible—of the hose with at least one electrically conductive thread in large quantities.

Illustration of the Invention

According to one aspect of the invention, in a flexible hose, particularly vacuum cleaner hose, having a wall which by an inner side delimits a cavity for the conveying of media and has at least at an outer side a profiling which as seen in section along a longitudinal axis of the hose has a wave shape with elevations and depressions, wherein provided at the outer side of the wall is at least one electrically conductive track extending around the wall and disposed in electrical contact with at least one electrically conductive thread electrically connecting mutually remote ends of the hose, the electrically conductive thread extends substantially along the longitudinal axis of the hose and transversely to the electrically conductive track and is secured to the outer side of the wall.

In other words, the electrically conductive thread—by contrast with the prior art discussed above—is not laid in the circumferential direction of the hose, but extends in longitudinal direction of the hose according to the invention, in which case it crosses the encircling electrically conductive track while producing an electrical contact and thus quasi an electrical short-circuit. Electrostatic charges collected in the electrically conductive track as a “first electrically conductive device” are thus conducted away directly via the electrically conductive thread as a “second electrically conductive device” to the ends of the hose.

Since the electrical conductive thread at the wall of the hose according to the invention does not encircle the longitudinal axis thereof, but as seen in plan view extends along or substantially parallel to the longitudinal axis of the hose, less electrically conductive material for this second electrically conductive device is needed by comparison with the prior art outlined above. This is not only of advantage with respect to a comparatively low electrical resistance, but is also accompanied by advantages in cost and weight.

This possibility of influencing on the electrical resistance of the hose by the electrically conductive thread constructed or arranged in accordance with the invention can also have the effect, depending on the respectively desired or required capability of electrical dissipation, of differently distributing the individual resistances of track and thread, for instance to reduce the electrical dissipation capability of the electrically conductive track, for example by reduction in the carbon content in a plastics material—which is made electrically conductive by addition of carbon—for the electrically conductive track, which similarly offers cost advantages.

Moreover, since the electrically conductive thread has been mounted on the outer side of the wall it is simpler—again by comparison with the prior art discussed in the introduction, in which all electrically conductive devices are integrated in the hose, more precisely in the wall thereof—to remove the electrically conductive thread of a hose, which is to be discarded, from the rest of the hose for recycling purposes.

Not least, the construction of the hose according to the invention advantageously allows, in the manufacture thereof, a (at least) two-stage procedure in which initially a basic hose with the electrically conductive track is produced as a first electrically conductive device before—only in a second step—this basic hose is enhanced with respect to an improved capability of electrical dissipation by application of the electrically conductive thread as a second electrically conductive device. As a consequence of this modular construction of the hose it is thus possible to produce hoses as desired or required with different electrical dissipation capability from a form of kit, which ensures a high degree of flexibility in hose production and also offers cost advantages.

The term “electrically conductive thread” here represents the most general understanding of an electrical conductor, the length dimension of which is very much greater than its width dimension and thickness dimension. In that case, the “thread” can in principle also be at the same time an electrical conductor and fastening measure, such as is the case, for example, with a narrow adhesive tape made electrically conductive or an adhesive made electrically conductive and coated in a narrow longitudinal track, be it—depending on the kind of hardening taking place—for example a two-component or multi-component adhesive, an adhesive reacting under visible light or ultraviolet light or of thermoplastic nature (hot-melt adhesive).

If the electrically conductive thread and the fastening member for it are two components, it is basically possible to lay the electrically conductive thread on the profiling of the hose and then or thereafter to conceal or coat it by, for example, a hot adhesive, an ultraviolet adhesive or an ultraviolet lacquer or a track of an appropriately reacting or setting synthetic material foam or casting resin. On the other hand and particularly with respect to production economically and with process reliability it is, however, currently preferred if the electrically conductive thread is secured to the outer side of the wall by an adhesive strip. In an advantageous embodiment the adhesive strip can in that case cover the electrically conductive thread to both sides as seen in circumferential direction of the hose, which is conducive to a best possible in-contact retention of the electrically conductive thread at the electrically conductive track.

Moreover, provision can be made for the electrically conductive thread or the adhesive strip, which covers the electrically conductive thread, to be surrounded at the outer side of the wall—in a given case as a further enhancement—by a braiding of the hose. In that regard the braiding can advantageously serve as (an additional) securing and/or as (a further) protection of the electrically conductive thread at the outer side of the wall of the hose. In an appropriate embodiment of the device for braiding of the flexible hose it is also possible to apply and secure the at least one electrically conductive thread to the outer side of the wall during the braiding. A combination of fastening of the electrically conductive thread by an adhesive strip and braiding of the hose presents itself particularly when the application of the electrically conductive thread and the braiding take place at different locations and/or at different times.

In principle, it is possible to provide the electrically conductive track at any position on the outer side of the wall of the hose as long as it is ensured that the at least one electrically conductive thread can electrically contact and short-circuit the electrically conductive track. However, it is preferred, particularly with respect to an easiest and most reliable possible contacting of the electrically conductive track by the electrically conductive thread, if the electrically conductive track is formed on the outer side of the wall near to or at the elevations of the profiling.

In an advantageous embodiment of the flexible hose provision can additionally be made for the hose to be provided at one or both of the mutually remote ends with a hose mounting member of an electrically conductive material, optionally also as an adapter, which at the finished hose preferably rotatably retains a further connecting piece with, for example, a cone or bayonet to guarantee correct hose connection with associated terminal equipment (for example a vacuum cleaner) or tool. It is then possible by way of the hose mounting member and the connecting piece optionally mounted thereon to transfer to the terminal equipment and the grounding thereof electrostatic charges collected by the electrically conductive track of the hose and, in particular, transferred by way of the electrically conductive thread to the hose ends, and thus conduct away or remove those charges. The hose mounting members and/or the connecting pieces mounted thereon can if required additionally be provided with metallic contacts. In a corresponding embodiment of the hose mounting members and/or the connecting pieces mounted thereon it is also advantageously possible for electrostatic charges to be conducted away via the hose to terminal equipment such as, for example, a vacuum cleaner, which charges occur, for example, during an abrading or polishing process at/in an abrading machine. This can be of interest especially when the machine itself does not have an earthed or grounded connection or alternatively is driven by compressed air or with use of battery technology.

The following two variants, in particular, present themselves for attaching the afore-mentioned hose mounting members to the hose ends: In the first variant, when the profiling of the hose at the outer side is helical, the end of the hose can be screwed by the helical profiling into an associated internally threaded section of the hose mounting member, wherein the electrically conductive thread is clamped between the profiling and the internally threaded section with formation of an electrical contact.

Such an embodiment advantageously allows “refitting” of a defective hose such as can be desired, for example, by professional users, in that the hose mounting member is unscrewed from the defective hose, the defective or leaking hose section is cut off and the hose mounting member is then screwed back onto the appropriately shortened hose. A further advantage of this variant is that, in the event of repair of the hose, re-establishing contact of the electrically conductive thread with the hose mounting member takes place in particularly simple manner as a consequence of the mentioned clamping of the electrically conductive thread between the profiling of the hose and the internally threaded section.

If such a repair possibility of the hose is not required or, for example, in order to reduce production costs is not desired, in the other variant the end of the hose can be plugged into an associated receiving section of the hose mounting member and glued to the hose mounting member by an electrically conductive adhesive, into which the electrically conductive thread extends with formation of an electrical contact. It is obviously also possible to realize the two variants at the ends of one and the same hose if the hose is to be equipped with not just hose mounting members of one variant.

In principle, the basic hose can be formed by, for example, blow-molding of a suitable plastics material, optionally also with an electrically conductive track wound around the hose in a subsequent step. Thereagainst, however, it is preferred if the wall of the hose is formed overall from a helically wound profile, with adjacent windings of the profile being connected together in media-tight manner. Advantages of such a wound hose by comparison with a blow-molded hose consist particularly in that the hose can be formed with a substantially smooth inner surface and accordingly small flow losses as well as only mild noise output in operation and in addition higher levels of suction performance can be realized as a consequence of good shape stability and restoring capability of the hose.

In a preferred embodiment of the wound hose the adjacent windings of the profile are connected together by a hot-melt adhesive in media-tight manner. This ensures production of the basic hose in a manner which is reliable in terms of process, rapid and economic. However, other possibilities of connection, for example, production of a material couple between the individual profile windings by laser welding, are also conceivable.

With respect to the method, the present invention provides a method for producing a flexible hose, which comprises at least the following three method steps a) to c): a) forming a basic hose having a wall which by an inner side delimits a cavity about a longitudinal axis and has at least at an outer side a profiling which as seen in section has a wave shape with elevations and depressions, wherein the wall is formed from an electrically conductive material or at least one electrically conductive track is formed at the outer side of the wall so that the electrically conductive track extends around the wall; b) applying at least one electrically conductive thread to the outer side of the wall so that the electrically conductive thread extends substantially along the longitudinal axis and transversely to the electrically conductive track; and c) securing the electrically conductive thread to the outer side of the wall so that the electrically conductive thread electrically contacts the electrically conductive track.

Of significance here is the separation of the method steps a) of forming the basic hose on the one hand and b) of applying and c) securing the electrically conductive thread to the outer side of the wall on the other hand. In the result, this leads to the afore-described recycling advantages, because the electrically conductive thread subsequently applied/secured to the outer side of the wall can fundamentally be more easily removed again than a conductor which is an integral constituent of the basic hose.

This separation of the method steps a) on the one hand and b) and c) on the other hand, however, also offers the advantage that in the manner of a construction kit system a hose of the same basic type—which indeed has the electrically conductive track, but (still) has no increased electrical dissipation capability—can, depending on the respective electrical dissipation requirements, be further enhanced by application/securing the electrically conductive thread or even not so enhanced if this is not necessary or desired. Thus, it is also possible to further electrically equip a hose of the same basic type selectively in correspondence with the respective requirements or wishes by the application/ securing of different electrically conductive threads which, for example, differ in kind, material, dimensions and/or number.

As already mentioned further above, in step a) of forming the basic hose use can, in principle, be made of a blow-molding process. On the other hand, particularly with respect to simplest possible integration of the electrically conductive track in the hose, it is, however, preferred if in the step a) of forming the basic hose initially a profile of an electrically conductive plastics material is extruded or a profile of two plastics materials of different electrical conductivity is co-extruded so that the profile comprises at least one electrically conductive track, whereupon the profile is helically wound for formation of the wall of the basic hose, in which case adjacent windings of the profile are connected together in media-tight manner. In that regard, for preference the adjacent windings of the profile are, in a manner which is particularly reliable in terms of process, media-tightly connected together by a hot-melt adhesive.

In addition, steps b) of applying and c) of securing the electrically conductive thread to the outer side of the wall can in principle be performed in succession, particularly when the electrically conductive thread and the fastening member for it are two distinct components of the hose. Thereagainst, especially with respect to the most rapid and efficient production possible, it is, however, preferred if the steps b) of applying and c) of securing the electrically conductive thread to the outer side of the wall are performed at the same time, even when the electrically conductive thread and the fastening member for it are two distinct components of the hose.

After execution of the steps a) to c) the hose is already present as a semi-finished plastics material product which in a given case can be supplied as a roll product for further making up, for example, at the manufacturer of terminal equipment such as a vacuum cleaner. The preferred further making-up of the hose can, however, also take place at the hose manufacturer, for example directly subsequent to the production of the semi-finished plastics material product in that after step c) of securing the electrically conductive thread to the outer side of the wall a hose mounting member of an electrically conductive material, which electrically contacts the electrically conductive thread, is attached to one or both of the mutually remote ends of the hose cut to length.

With respect to the device, according to the invention a device for applying an electrically conductive thread to an outer side of a flexible hose is proposed, which has thereat, i.e. at an outer side, a profiling which as seen in section along a longitudinal axis of the hose has a wave shape with elevations and depressions, with the feature that an applicator for the electrically conductive thread is provided and has a rotatable applicator wheel similar to a stock wheel or cell wheel, to the outer circumference of which applicator wheel the electrically conductive thread can be fed and which applicator wheel is adapted to enter into interlocking engagement with the profiling of the hose layable in a hose support so that when the applicator wheel is rotating a relative advance movement between the hose and applicator takes place, in which the applicator wheel applies the electrically conductive thread to the profiling of the hose along the longitudinal axis of the hose while following the elevations and depressions.

Through the embodiment of the applicator wheel in accordance with the invention, which is capable of meshing with the profiling at the outer side of the hose in the manner of a rack drive, there advantageously results a constrained coupling of advance movement and coating/application movement for the electrically conductive thread. As a result, on the one hand it can be ensured that an appropriate or associated length of electrically conductive thread is always deposited or applied per length of hose, which can be conducive particularly to uniform and/or stress-free application of the electrically conductive thread to the profiling of the hose.

On the other hand, it is possible to advantageously use only one drive in order to generate both movements, i.e. relative advance movement for the hose and coating or application movement for the electrically conductive thread. Thus, for example, it is possible for the applicator to be—actively—moved with respect to the hose or the hose to be—actively—moved with respect to the applicator (relative advance), while the applicator wheel as a consequence of the interlocking engagement with the hose—passively—rolls thereon and lays down the electrically conductive thread (coating or depositing). In addition, it is possible to fix the applicator and to—actively—rotationally drive the applicator wheel (coating or depositing of the electrically conductive thread), wherein the hose as a consequence of the interlocking engagement between the applicator wheel and the profiling of the hose is—passively—drawn away under the applicator wheel (relative advance). Moreover, there is the possibility of designing the applicator to be movable and to—actively—rotationally drive the applicator wheel (coating or depositing of the electrically conductive thread) so that the applicator together with the applicator wheel by virtue of the interlock between the applicator wheel and the profiling of the hose—passively—moves with respect to the optionally suitably fixed hose (relative advance).

If at least two drives respectively associated with the applicator, the applicator wheel or the hose are provided, then it is possible in addition to co-ordinate the generated movements with respect to movement execution (speed, acceleration) with, for example, use of a suitable electronic system, for example to deposit or attach the electrically conductive thread on or to the profiling of the hose with little tension or, especially, "loosely", thus relieved of tension.

One of the criteria with regard to which components or subassemblies of the device are constructed or arranged to be stationary and which are constructed or arranged to be movable is the length of the flexible hose to be provided with the electrically conductive thread. In the case of a hose as a roll product or in endless production it is possible, for example, to construct the applicator to be stationary and thereagainst to move the hose with respect to the applicator. Particularly with respect to simple realization of the application process with hoses of defined length a construction of the device is currently preferred in which the hose rest is mounted in stationary position on a frame of the device, wherein the applicator comprises an applicator carriage which carries the applicator wheel and is guided at the frame to be displaceable along the hose rest.

Moreover, with respect to reliable process performance it is also preferred if the applicator wheel is drivably connected with a rotary drive so that the applicator wheel can be actively rotationally driven.

Moreover, an embodiment of the device is preferred in which the applicator comprises an applicator arm on which the applicator wheel is rotatably mounted and which is pivotable with respect to the hose rest about a selectively fixable pivot axis. It is thus possible to use the device with its applicator, without significant conversion work, for hoses of different thickness and/or basic shape (for example cylindrical or conical at the outer circumference). In the case of, for example, conical hoses the applicator wheel can thus follow without problems the thickness of the hose increasing and decreasing over the length of the hose. Through fixing the pivot axis for the applicator arm it is in addition possible to advantageously generate and set a specific pressing pressure of the applicator wheel against the hose in the case of, for example, a hose, which is cylindrical at the outer circumference, with use of the intrinsic elasticity of the hose.

Furthermore, the arrangement is preferably such that the applicator arm together with the applicator wheel and the pivot axis thereof is so positioned with respect to the hose rest that a torque about the pivot axis in the direction of the hose rest results and/or that the applicator arm is resiliently biased about its pivot axis in the direction of the hose rest. The intrinsic weight of the applicator arm together with the components mounted thereon or the center of gravity thereof with respect to the pivot axis and/or the spring force acting on the applicator arm can be so provided or selected in simple manner in the case of such an embodiment that the applicator wheel on application of the electrically conductive thread to the hose always bears against the hose by a defined pressing force.

As already mentioned in the introduction, it is in principle possible to initially position the electrically conductive thread at or in the profiling of the hose by the applicator wheel and secure it to the hose only in a succeeding step, so that the electrically conductive thread is in permanent electrical contact with the electrically conductive track of the hose. Particularly with respect to a largest possible throughput and a high level of process reliability in hose production it is, however, preferred if the application and the securing of the electrically conductive thread to the hose take place at the same time. For this purpose an embodiment of the device is currently preferred in which the applicator comprises a feed device for the electrically conductive thread and a feed device for an adhesive strip, wherein the electrically conductive thread and the adhesive strip can be fed from the feed devices to a pair of guide rollers which are adapted to combine thread and adhesive strip before onward guidance to the applicator wheel takes place. It can thus be ensured on the one hand in simple manner that the electrically conductive thread experiences precise positioning and good securing to the hose and on the other hand that the electrically conductive thread can thus be protected, during application, by the adhesive strip against, for example, excessive tension.

Finally, it is preferred if the applicator wheel has between two hub sections a plurality of axle pins which are uniformly distributed over the circumference and which each rotatably mount a hollow-cylindrical sleeve as pressing body for the electrically conductive thread. During application and securing of the electrically conductive thread to the hose this measure is also advantageously conducive to mechanical load relief of the electrically conductive thread.

Further features, characteristics and advantages of the electrically dissipative flexible hose according to the invention, the method according to the invention for production of such a hose and the device according to the invention for application of an electrically conductive thread to a profiled outer side of a flexible hose are evident to the expert from the following description of preferred embodiments.

BRIEF DESCRIPTION OF THE DRAWINGS

The invention is explained in more detail in the following by way of preferred embodiments with reference to the accompanying, partly schematic, drawings, in which the same or corresponding parts or sections are provided with the same reference numerals, wherein in the drawings:

FIG. 7 shows a once-interrupted perspective view of a device according to the invention for application of the electrically conductive thread to the flexible hose according to FIG. 1 from obliquely above and laterally left, with a view of an applicator for the electrically conductive thread in a start position with respect to the hose;

FIG. 8 shows a once-interrupted perspective view, which corresponds with FIG. 7, of the device according to FIG. 7 obliquely from above and the left side, in which the applicator is disposed in a middle position over the flexible hose;

DETAILED DESCRIPTION OF THE EMBODIMENTS

Figure 1:
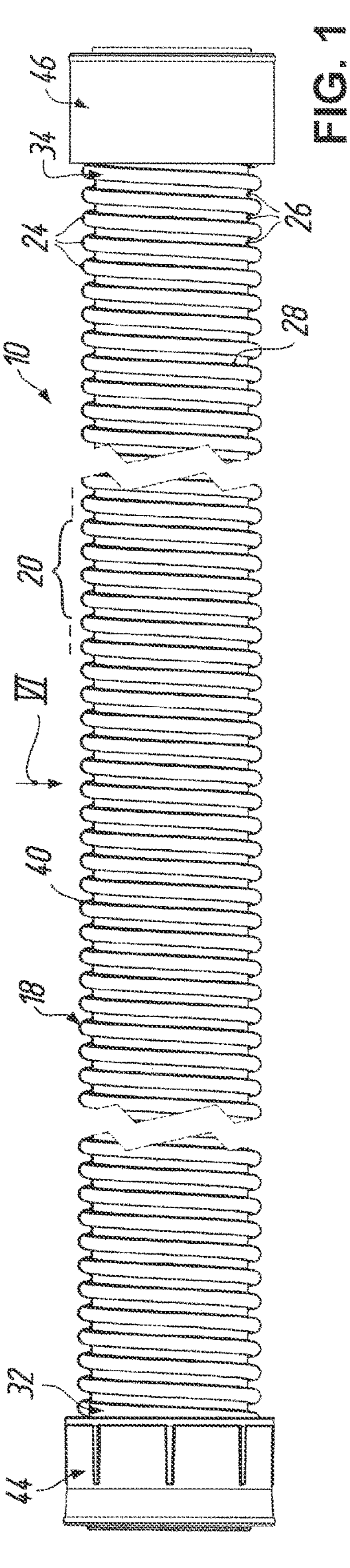
FIG. 1 shows a twice-interrupted side view of a flexible hose, namely a vacuum cleaner hose, according to a first embodiment of the invention, which is provided at both sides with a hose mounting member.

A vacuum cleaner hose, as an example of a flexible hose, is denoted generally by the reference numeral 10 in the figures. According to, in particular, FIGS. 2 to 5 or 16 and 17 the hose 10 has a wall 12 which by an inner side 14 bounds a cavity 16 for the conveying of media. At an outer side, the wall 12 has a profiling 20 which as seen in section along a longitudinal axis 22 of the hose 10 has a wave shape with elevations 24 and depressions 26. As can be best seen in FIGS. 3 to 6 and 17, provided at the outer side 18 of the wall 12 is at least one electrically conductive track 28 which extends around the wall 12 and serves the purpose of collecting and passing on electrostatic charges. As explained in more detail in the following, the electrically conductive track 28 is in electrical contact with at least one electrically conductive thread 30, which electrically connects mutually remote ends 32, 34 of the hose 10 so as to conduct away the electrostatic charges thereat.

Figure 5:
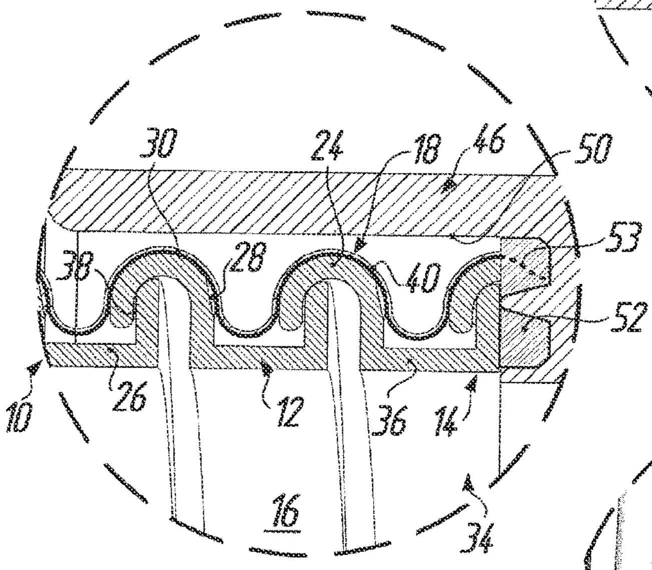
FIG. 5 shows an illustration, which is enlarged in scale, of the detail V in FIG. 2 at the hose mounting member, which is on the right in FIGS. 1 and 2, of the flexible hose according to FIG. 1.
Figure 6:
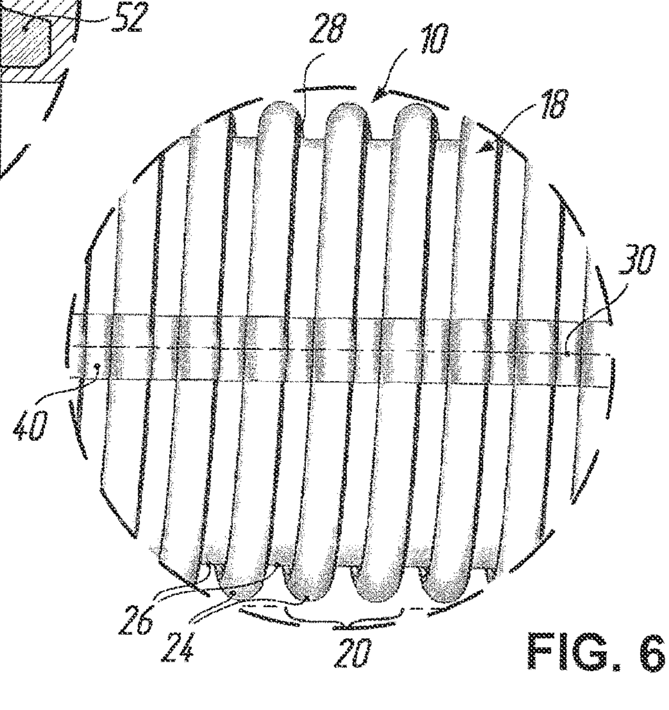
FIG. 6 shows a broken-away plan view, which is enlarged in scale, of the flexible hose according to FIG. 1, with a viewing direction corresponding with the arrow VI in FIG. 1, wherein an electrically conductive thread, which is secured to an outer side of the hose by an adhesive strip, for conducting away electrostatic charges is illustrated by dashed line.

In that regard, according to, for example, FIG. 6 the electrically conductive thread 30 extends substantially along the longitudinal axis 22 of the hose 10 and transversely to the electrically conductive track 28 or crossing the latter, wherein the electrically conductive thread 30 is secured to the outer side 18 of the wall 12 as can be seen in, in particular, FIGS. 3 to 5 and 17. In this embodiment, the electrically conductive thread 30 follows the elevations 24 and depressions 26 of the profiling 20, wherein the thread 30 directly bears against the elevations 24 and—for producing an electrical contact—obviously against the electrically conductive track 28, whereas the thread 30 in the region of the depressions 26 has a certain spacing from the wall 12. By comparison with an equally possible "stretched out" course of the electrically conductive thread 30 it is thus possible, for example, to achieve a greater degree of flexibility of the hose 10.

In the illustrated embodiments the hose is a wound flexible hose 10, i.e. a hose 10 of which the wall 12 is formed from a profile 26 helically wound around the longitudinal axis 22, wherein adjacent windings of the profile 36 are connected together to be sealed relative to media. The profile 36 shown here by way of example has as seen in cross-section two regions, namely a region on the right in each of FIGS. 3 to 5 and 17, the cross-section of which has substantially the form of the letter U in "angular" style of writing and which at the wound hose 10 forms the depressions 26 of the profiling 20, and a region on the left in each of FIGS. 3 to 5 and 17, which as considered in cross-section has substantially the form of a letter C in horizontal position or tipped in clockwise sense through 90° and forms at the wound hose 10 the elevations 24 of the profile 20. As can be readily seen in FIGS. 3 to 5 and 17, the C-shaped region of a winding of the profile 36 is quasi "hooked" over the righthand limb of the U-shaped region of an adjacent winding of the profile 36 so that in each instance a short profile overlap along the longitudinal axis 22 arises thereat. In order to provide media-tight connection of the adjacent windings of the profile 36 there is provided in the region of this profile overlap, for example, a hot-melt adhesive 38 which forms the helically encircling seam shown in FIGS. 3 to 5 and 17.

It is also evident from FIGS. 3 to 5 and 17 that the electrically conductive track 28 of the hose 10 is formed on the outer side 18 of the wall 12 near to or at the elevations 24 of the profiling 20 and, in particular, as a sub-region of the profile 36, which in the wound state of the profile 36 similarly extends helically around the longitudinal axis 22.

In the illustrated embodiments the profile 36 is co-extruded from two plastics materials of different electrical conductivity so that the profile 36 includes the electrically conductive track 28. In that regard, a principal part of the profile 36 can consist of a non-conductive plastics material such as, for example, polyethylene (PE), polypropylene (PP) or an ethylene vinyl acetate copolymer (EVAC), whereas the electrically conductive track 28 is formed from a conductive plastics material. The latter can be, for example, a PE, PP or EVAC basic material which is rendered conductive by addition of conductive components such as, for example, carbon particles.

However, in the alternative it is also possible in correspondence with the respective electrical dissipation requirements to co-extrude the profile 36 entirely from such electrically conductive plastics materials and, in a given case, to even extrude with material uniformity. In such a case the profile overall forms the electrically conductive track by its outer surface.

As far as the hot-melt adhesive 38 is concerned this can similarly consist of a plastics material such as, for example, PE or EVAC, which is either non-conductive or is made conductive.

By the term "electrically conductive thread" 30 generally used here there is to be understood on the one hand a metalized thread, cord or yarn, for example an elastic yarn of a plastics material such as polyamide (PA), which is provided with, for example, a silver coating or a coating of copper, gold or platinum promising very good conductivity, or, however, a track or a (adhesive) strip of a plastics material or synthetic resin made electrically conductive in suitable manner, but also on the other hand pure metallic conductors such as wires or strands of copper or the like, wherein the actual realization of the electrically conductive thread 30 depends on which demands are placed on the hose 10 with respect to, in particular, the electrical and mechanical properties thereof. Thus, for example, in the case of a flexible hose 10 which is subject in use to greater degrees of alternating bending loads or tension loads it has to be ensured that the electrically conductive thread 30 does not break or tear or do so prematurely, which tends to exclude metallic conductors, which may be liable to work-harden, from such a case of use. With respect to electrical conductivity, a specification with respect thereto can be, for example, that the entire hose has to have only a predetermined resistive impedance able to be achieved, for example, by suitable selection of the electrically conductive thread 30.

As already mentioned further above, at least one electrically conductive thread 30 is provided, i.e. in correspondence with the respective requirements it is also possible to provide several electrically conductive threads in order to, for example, reduce the electrical resistance in an overall arrangement and/or provide a—optionally multiple—redundant overall arrangement. In that regard, the electrically conductive threads 30 can run adjacent to one another or at least partly cross or intersect under electrical contact with one another. In such a case the electrical connection of the mutually remote ends 32, 34 of the hose 10 and the electrical contacting of the electrically conducting track 28 is achieved by the overall arrangement of electrically conductive threads 30. In other words, it is in principle possible that none of the electrically conductive threads 30 of such an overall arrangement by itself bridges the entire path between the mutually remote ends 32, 34 of the hose 10, but the overall arrangement and/or only a part or one of the electrically conductive threads 30 of such an overall arrangement contacts the electrically conductive track 28.

As, moreover, FIGS. 3 to 6 and 17, in particular, show, the at least one electrically conductive thread 30 in the illustrated embodiments is secured to the outer side 18 of the wall 12 by an adhesive strip 40. According to FIG. 6 the adhesive strip 40 can in that case cover the electrically conductive thread 30 to both sides as seen in circumferential direction of the hose 10. The adhesive strip 40 is then designed so that its adhesive side reliably adheres to the plastics material of the wall 12 or of the profile 36. Possible backings for the adhesive strip 40 are foils, non-woven fabrics or textiles of a synthetic material such as, for example, PE, PP, polyvinylchloride (PVC), polyethylene terephthalate (PET), polyimide (PI) or polyurethane (PUR), according to the respective field of use of the hose 10.

Figure 15:
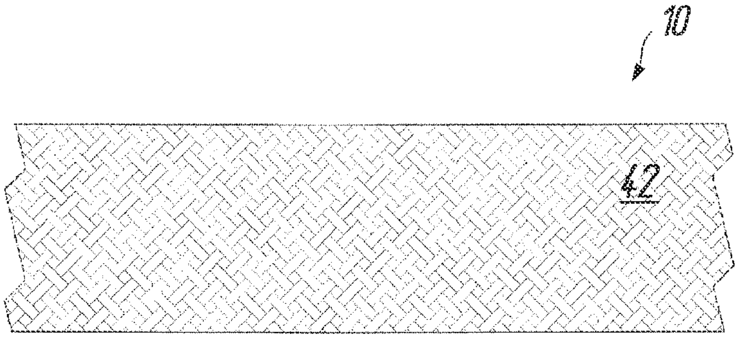
FIG. 15 shows a side view, which is broken away on both sides, of a flexible hose, namely a vacuum cleaner hose, according to a second embodiment of the invention, in which the hose is provided on its outer side with a braiding.
Figure 16:
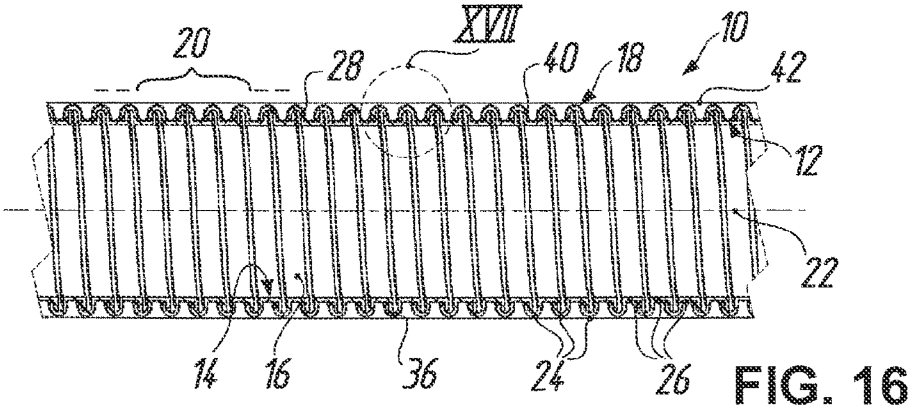
FIG. 16 shows a longitudinal sectional view, which is broken away on both sides, of the flexible hose according to FIG. 15.
Figure 17:
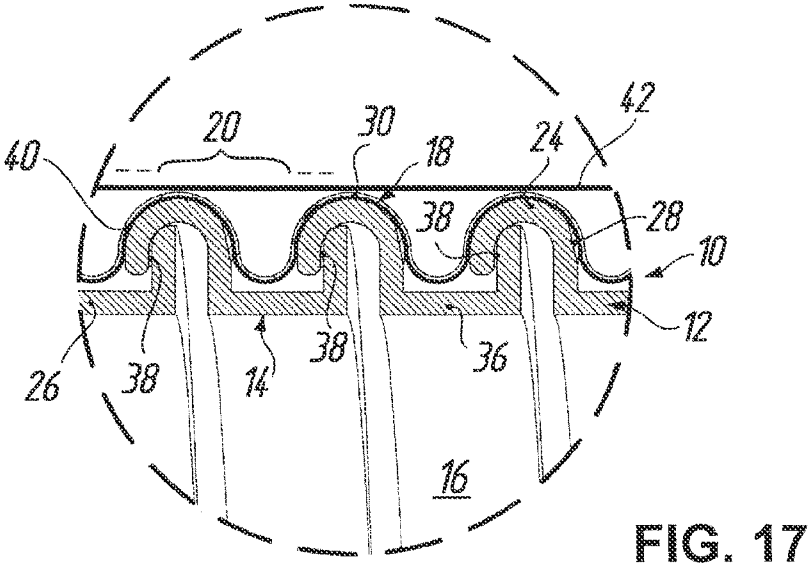
FIG. 17 shows an illustration, which is enlarged in scale, of the detail XVII in FIG. 16 in a middle region of the flexible hose according to FIG. 15.

In the embodiment according to FIGS. 15 to 17 there is an additional feature that the adhesive strip 40 covering the electrically conductive thread 30 is surrounded at the outer side 18 of the wall 12 of the hose 10 by a braiding 42. The braiding 42 can consist of monofilamentary and/or multi-filamentary threads of a thermoplastic plastics material such as, for example, PA or PE. The multifilamentary threads during bending of the hose 10 lay flatly against the hose 10 on the tension side and compress on the compression side of the hose 10 transversely to the thread and thus also towards the wall 12 of the hose 10, so that the braiding 42 always bears against the wall 12. In a particularly advantageous mixture ratio of 50% multifilamentary threads to 50% mono-filamentary threads the braided surface of the hose 10 in addition always remains closed. The electrically conductive thread in an embodiment, which is not illustrated here, can thus be held in position at the wall by the braiding even without the adhesive strip covering it, wherein in fact through suitable placing of the electrically conductive track at the elevations of the profiling it is ensured that the electrically conductive thread crosses the electrically conductive track under contact and thus makes electrical contact.

The afore-described hose 10 can in principle be produced as a roll product at the hose manufacturer and, for example, be supplied to the manufacturer of relevant terminal equipment such as, for example, vacuum cleaners, where further making-up of the hose 10 is then carried out, which usually comprises cutting the hose 10 to length and providing the hose 10 at the ends with use-specific end members. However, it is also possible—and frequently the case—that the hose manufacturer further makes up the hose 10.

Figure 2:
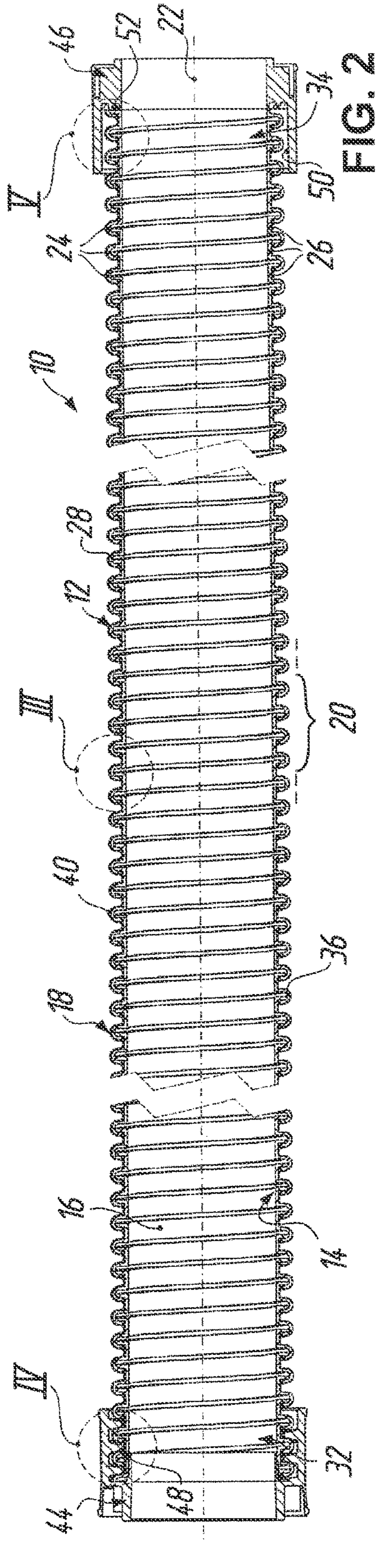
FIG. 2 shows a twice-interrupted longitudinal sectional view of the flexible hose according to FIG. 1.
Figure 3:
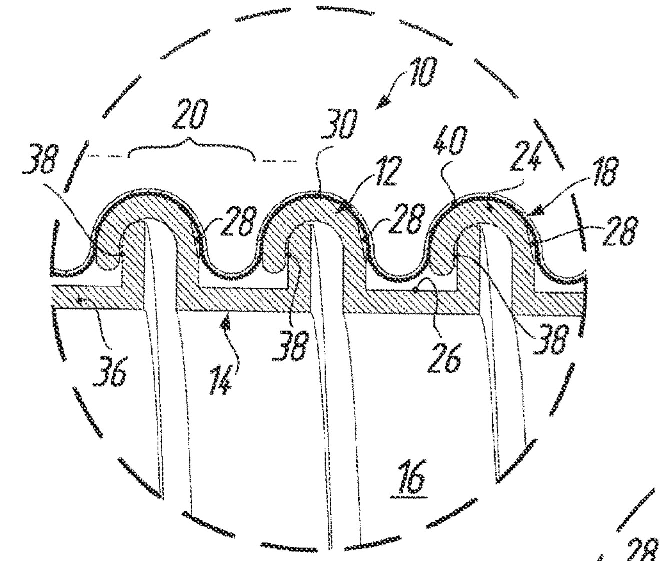
FIG. 3 shows an illustration, which is enlarged in scale, of the detail III in FIG. 2 in a middle region of the flexible hose according to FIG. 1.
Figure 4:
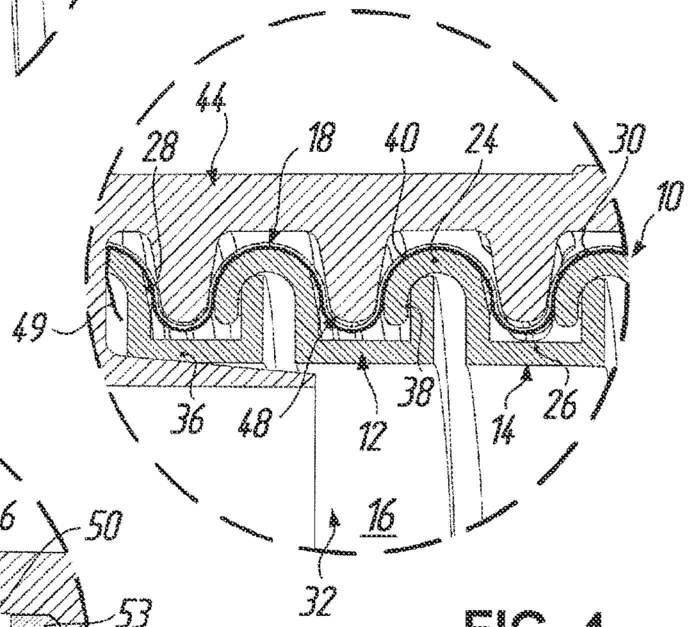
FIG. 4 shows an illustration, which is enlarged in scale, of the detail IV in FIG. 2 at the hose mounting member, which is on the left in FIGS. 1 and 2, of the flexible hose according to FIG. 1.

In the embodiment in FIGS. 1 and 2 the hose 10 is cut to length and provided at the two mutually remote ends 32, 34 with a hose mounting member 44, 46 of an electrically conductive material, by way of which a desired conducting away of electrostatic charges to, for example, terminal equipment and the grounding thereof can take place. Two different forms of hose mounting members 44, 46 are illustrated by way of example at one and the same hose 10 in FIGS. 1, 2, 4 and 5. These hose mounting members 44, 46 can optionally be connected or provided with a further use-specific end piece (not shown) so as to provide, for example, a connection geometry adapted to the specific use, but often also so as to provide a possibility of relative rotation between hose mounting member and end piece. Such hose mounting members and end pieces are familiar to the expert so that there shall be only brief discussion in the following of how the respective hose mounting member 44, 46 is secured to the wall 12 of the hose 10 and in that case an electrical contact between the electrically conductive thread 30 and the respective hose mounting member 44, 46 is effected.

In the hose mounting member 44, which is on the left in FIGS. 1 and 2 and the outer-side profiling 20 of which is helical as previously described, of the hose 10 the end 32 of the hose 10 is screwed together with the helical profile 20 in an associated internally threaded section 48 of the annular hose mounting member 44. A screw connection of that kind—which is reversible—has the advantage that in the case of, for example, a damaged hose 10 the hose mounting member 44 can be unscrewed, the hose 10 can be newly cut to length with removal of the defective hose region and then newly made up to finished state without problems by screwing back on the hose mounting member 44. In this form of securing, the electrically conductive thread 30 is clamped between the profiling 20 and the internally threaded section 48 with formation of an electrical contact. This is illustrated by way of example on the left in FIG. 4, where an end 49, which projects beyond the adhesive strip 40, of the electrically conductive thread 30 undergoes clamping of that kind.

On the other hand, in the case of the hose mounting member 46, which is on the right in FIGS. 1 and 2, of the hose 10 the end 34 of the hose 10 is plugged into an associated—here substantially hollow-cylindrical—receiving section 50 of the annular hose mounting member 46 and glued to the hose mounting member 46 by an electrically conductive adhesive 52. As indicated in FIG. 5 on the right by a dashed line, the electrically conductive thread 30 extends by an end 53, which protrudes beyond the adhesive strip 40, into the electrically conductive adhesive 52 with formation of an electrical contact.

A method of producing the flexible hose 10 sofar as described comprises in general the following three method steps a) to c): In a first step a), formation is carried out of a basic hose comprising the wall 12 which by its inner side 14 delimits the cavity 16 about the longitudinal axis 22 and has at least at its outer side 19 the profiling 20 which as seen in section has the wave shape with elevations 24 and depressions 26, wherein the wall 12 in its entirety is formed from an electrically conductive material or at least the electrically conductive track 28 at the outer side 18 of the wall 12, so that the electrically conductive track 28 extends around the wall 12. The basic hose produced to that extent is in principle already capable of use, i.e. no specific requirements with respect to the capability of dissipating electrostatic charges are imposed thereon, thus this basic hose can already be made up by cutting to length and providing it with suitable end pieces.

Only in a following step b) is the application now carried out, in the case of higher demands on the hose 10 with respect to capability of conducting away electrostatic charges, of the at least one electrically conductive thread 30 to the outer side 18 of the wall 12, so that the electrically conductive thread 30 extends substantially along the longitudinal axis 22 and transversely to the electrically conductive track 28. In other words, in this step the encircling electrically conductive track 28 is short-circuited or at least prepared for that purpose by the electrically conductive thread 30.

In order, finally, to maintain this electrical state in further processing and in later use of the hose 10 or bring about that state for that purpose, securing of the at least one electrically conductive thread 30 to the outer side 18 of the wall 12 is carried out in a further step c) so that the electrically conductive thread 30—permanently—electrically contacts the electrically conductive track 28. This securing can, as already mentioned above, be effected by attaching or applying the adhesive strip 40 and/or the braiding 42 to the outer side 18 of the wall 12 of the hose 10.

Preferred sub-steps of the step a) of forming the basic hose comprise, as already similarly discussed above, initially a sub-step in which the profile 36 is extruded from an electrically conductive plastics material or co-extruded from two plastics materials of different electrical conductivity so that the profile 36 has at least the electrically conductive track 28 even if not fully electrically conductive. In a further sub-step the profile 36 is thereupon helically wound for formation of the wall 12 of the basic hose, wherein adjacent windings of the profile 36 are media-tightly connected together by, for example, the hot-melt adhesive 38.

With respect to rapid and efficient mass production of hoses 10 it is particularly preferred if the steps b) of applying and c) of securing the electrically conductive thread 30 to the outer side 18 of the wall 12 are performed at the same time. A device which can be used for that purpose is described further below.

Finally, after the step c) of securing the electrically conductive thread 30 to the outer side 18 of the wall 12 the afore-described hose mounting member 44, 46 of an electrically conductive material can, for example, be attached to one or both of the mutually remote ends 32, 34 of the hose 10, which is cut to length as desired or necessary, and electrically contacts the electrically conductive thread 30.

Details of a device 54 for application of an electrically conductive thread 30 (or several electrically conductive threads 30) to the outer side 18 of, for example, the afore-described flexible hose 10, can be inferred from FIGS. 7 to 14. The device 54 has a frame 56, which in the illustrated embodiment is assembled from aluminum sections and at which the individual components or subassemblies of the device 54 are arranged. As FIGS. 7 to 9, in particular, show, the frame 56 is constructed in the manner of a ladder frame with two longitudinal profile members 58 fixedly connected together by a plurality of transverse profile members 60.

Figure 9:
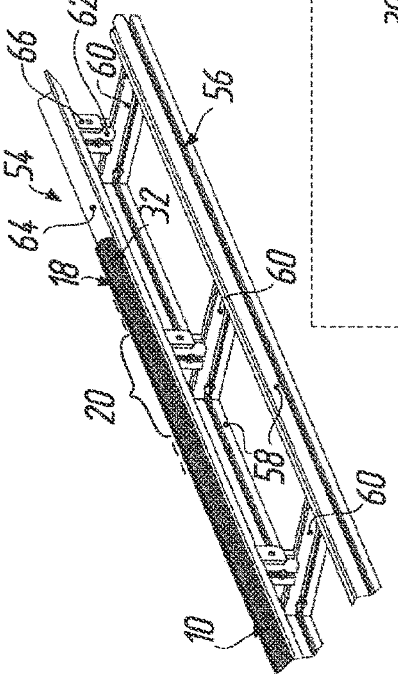
FIG. 9 shows a once-interrupted perspective view, which is again analogous to FIG. 7, of the device according to FIG. 7 obliquely from above and the left side, in which the applicator is disposed in an end position with respect to the flexible hose.
Figure 9:
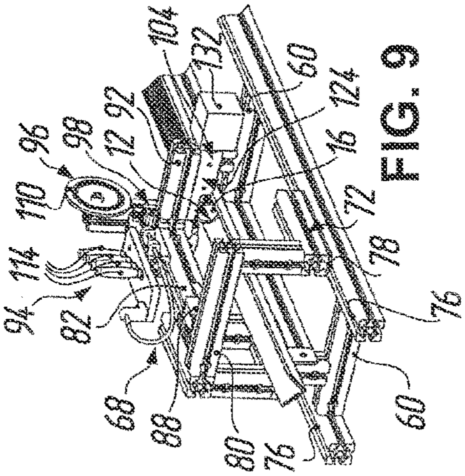

A hose rest 64 consisting of an elongate angle profile member with a V-shaped cross-section is erected on the transverse profile members 60 of the frame 56—see, in particular, FIGS. 7 and 8 on the lefthand side and FIG. 9 on the righthand side—by way of mounting profile members 62, the angle profile member being secured to the mounting profile members 62 by way of securing straps 66. As FIGS. 7 to 13 show, the hose support 64 serves for reception of the hose 10, which is to be equipped with the electrically conductive thread 30 and which automatically moves into a stable, lower end position in the hose support 64 by virtue of the V-shape of the hose support 64.

A core component of the device 34 is an applicator 68 for the electrically conductive thread 30, which—as described in more detail in the following—has a rotatable applicator wheel 70 similar to a stock wheel or cell wheel (see FIGS. 10 and 12 to 14), the electrically conductive thread 30 being fed to the outer circumference of the applicator wheel and the applicator wheel being adapted to enter into interlocking engagement with the profiling 20 of the hose laid in the hose support 64. As a result, when rotation of the applicator wheel takes place there is a relative advance movement between hose 10 and applicator 68 in which the applicator wheel 70 applies the electrically conductive thread 30 to the profiling 20 of the hose 10 along the longitudinal axis 22 of the hose 10 while following the elevations 24 and depressions 26.

Figure 10:
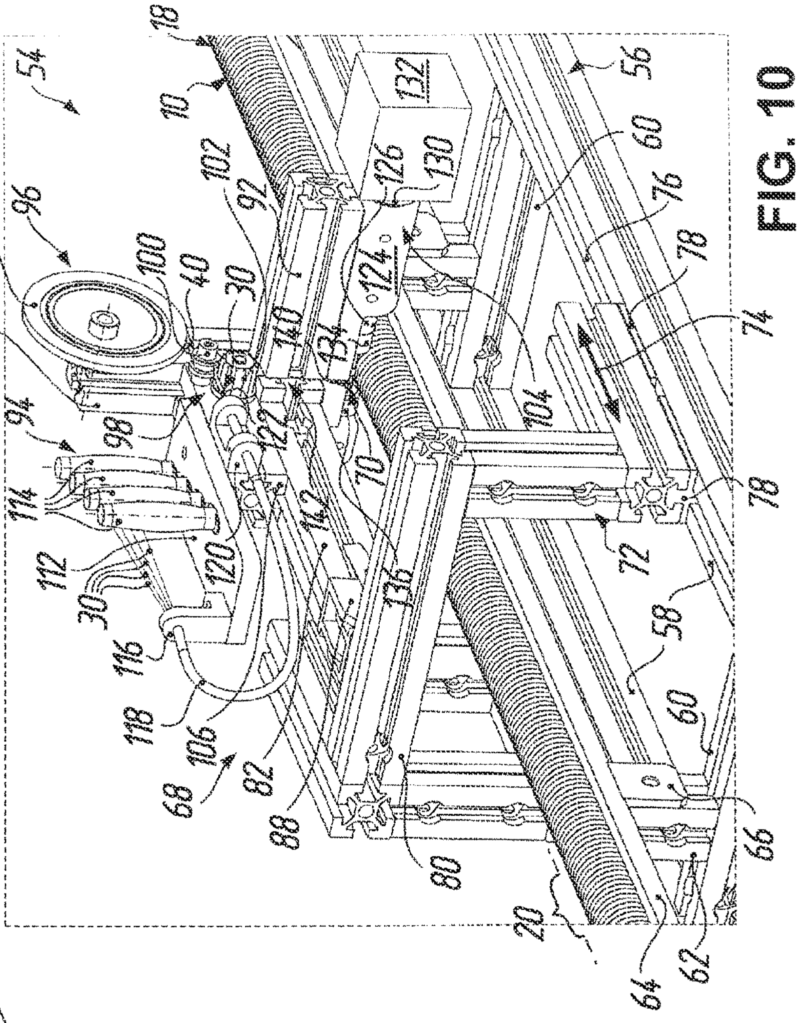
FIG. 10 shows an illustration, which is enlarged in scale, of the detail X in FIG. 8 for illustration of further details of the applicator of the device according to FIG. 7.
Figure 11:
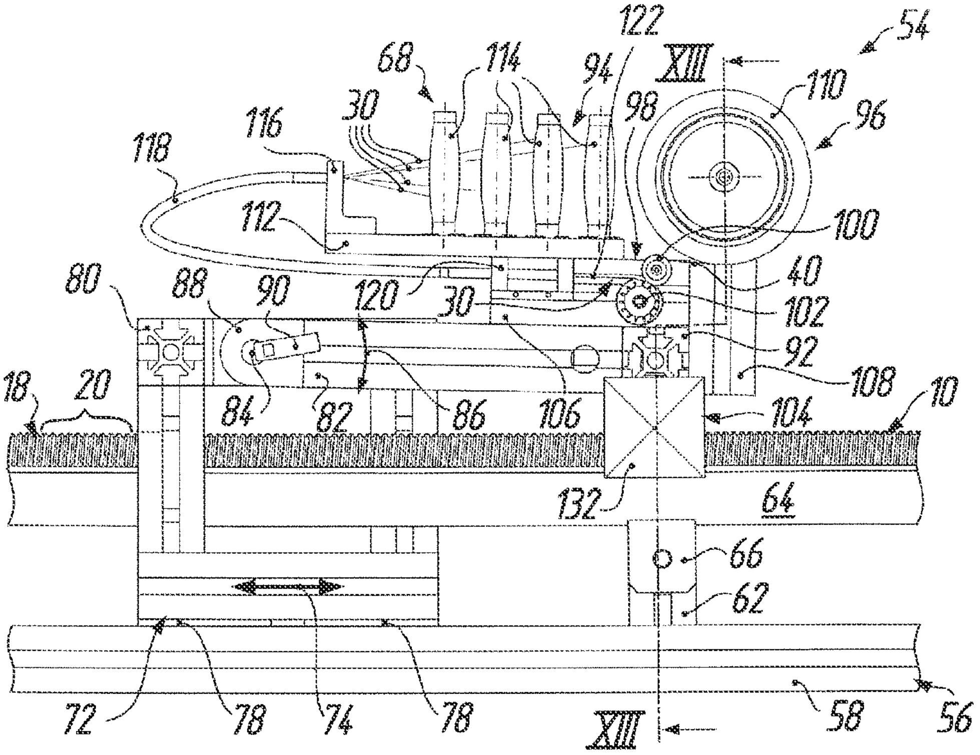
FIG. 11 shows a side view, which is broken away on both sides, of the device according to FIG. 7 with a view of the applicator disposed in the middle position in correspondence with FIG. 8.
Figure 13:
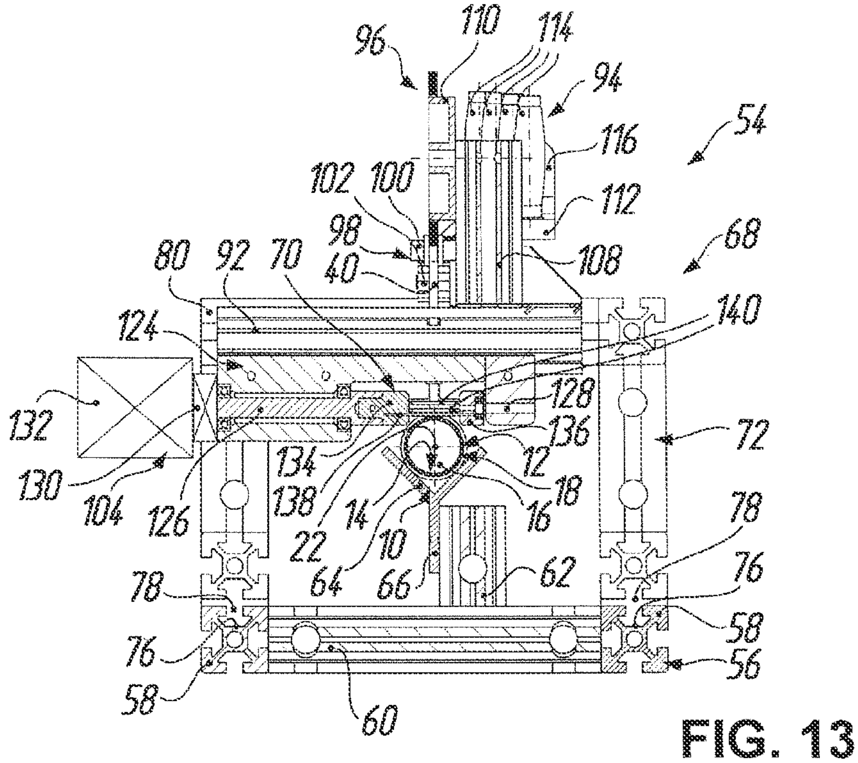
FIG. 13 shows a sectional view of the device according to FIG. 7 in correspondence with the offset section line XIII-XIII in FIG. 11.
Figure 14:
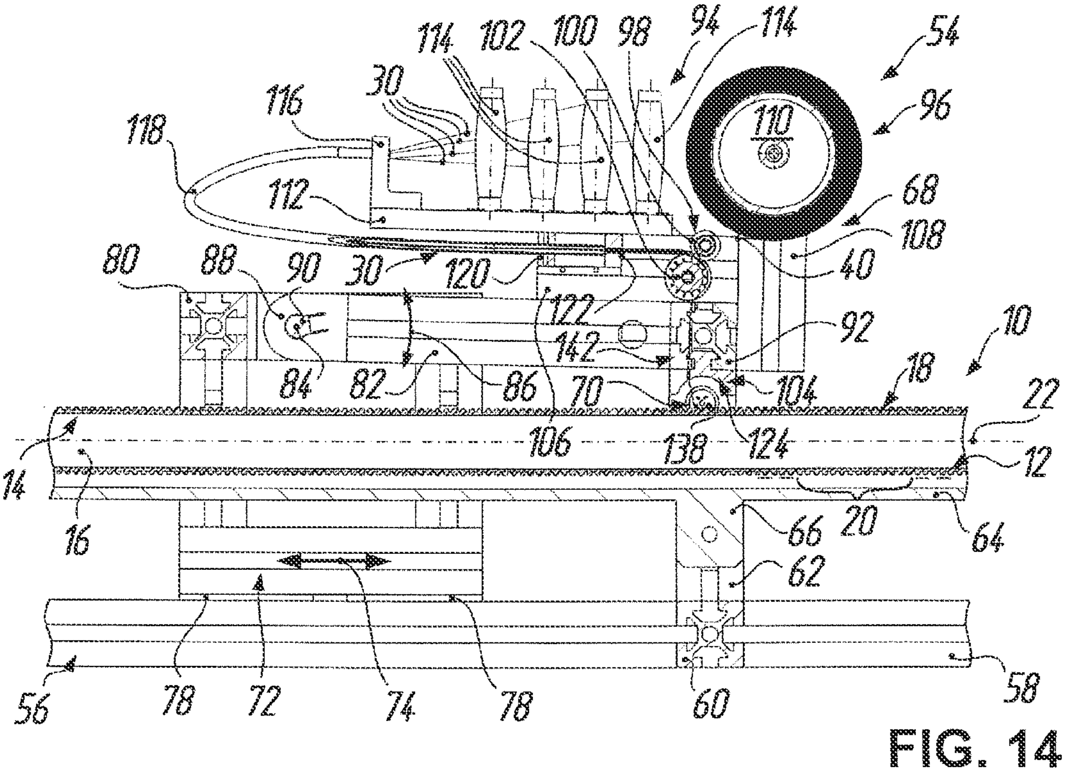
FIG. 14 shows a side view, which is broken away on both sides, of the device according to FIG. 7 in correspondence with the section line XIV-XIV in FIG. 12.

In the illustrated embodiment the arrangement is such that the hose support 64 is mounted in stationary position at the frame 56, whereas the applicator 68 comprises an applicator carriage 72 which carries the applicator wheel 70 in a manner still to be described and—as can be clearly seen in a comparison of FIGS. 7 to 9—is guided at the frame 56 to be displaceable along the hose support 64 (cf. also the double arrow 74 for the longitudinal movement in FIGS. 10, 11 and 14). For that purpose, the longitudinal profile members 58 of the frame 56 are each provided at the upper side thereof with a respective continuous guide groove 76 in which on each side of the frame 56 a pair of profile sliders 78 engage to be capable of sliding, the sliders for their part being fixedly connected with the applicator carriage 72. The applicator carriage 72 itself is, in the illustrated embodiment according to, in particular, FIGS. 10 to 14, again assembled from a plurality of aluminum profile sections, of which one profile section extends as cross member 80 over the hose support 64.

The applicator 68 further comprises an applicator arm 82, on which the applicator wheel 70 is rotatably mounted in a manner still to be described and which is pivotable with respect to the hose support 68 about a selectively definable pivot axis 84, which can be best seen in FIGS. 11 and 14 (cf. also the double arrow 86 for the pivot movement in these figures). For that purpose, the applicator arm 82 is pivotably coupled to the cross member of the applicator carriage 72 with the assistance of a joint 88 with a clamping lever 90. If the clamping lever 90 is fixed, then the applicator arm 82 is fixed in its respective angular position about the pivot axis 84. Thereagainst, when the clamping lever 90 is released, the applicator arm 82 can pivot about the pivot axis 84.

According to FIG. 14 the pivot axis 84 and the applicator wheel 70 are disposed at mutually remote ends of the applicator arm 82. As can be further seen particularly in FIGS. 10 and 14, the applicator arm 82 together with the applicator wheel 70 and its pivot axis 84 is so arranged with respect to the hose support 64 that a torque about the pivot axis 84 in the direction of the hose support 64 results and, in particular, due to the intrinsic weight of the applicator arm 82 and the components or subassemblies mounted thereon. As a consequence of this torque the applicator wheel 70 is pressed against a hose 10, which is placed in or at the hose support 64, and kept in engagement with the profiling 20 thereof.

If need be, the applicator arm 82 can also be manually pushed in the direction of the hose 10 and then fixed in this pressing position by fixing the clamping lever 90. In a variant, which is not illustrated in the figures, the applicator arm 82 can in addition also be resiliently biased about its pivot axis 84 in the direction of the hose support 64, for example by a tension spring, which is arranged to be effective in terms of actuation between the applicator arm 82 and lower part of the applicator carriage 72.

It will be evident to one ordinarily skilled in the art that by these measures the applicator wheel 70 can be reliably held in engagement with the profiling 20 of the hose 10 resting on the hose support 64. In that case, hoses 10 with different diameters and shapes (for example substantially cylindrical or conical) can be processed, i.e. provided with an electrically conductive thread 30.

As, moreover, can be best inferred from FIGS. 10, 11 and 14, the applicator arm 82 has a head part 92 consisting of an aluminum profile section, on which further components or subassemblies of the applicator 68 are mounted as described in the following. These components and subassemblies are in detail a feed device 94 for the electrically conductive thread 30, a feed device 96 for the adhesive strip 40, a guide roller arrangement 96 with a pair of guide rollers 100, 102 for combining the electrically conductive thread 30 with the adhesive strip 40 before transfer to the applicator wheel 70 takes place, and a mounting and drive arrangement 104 for the applicator wheel 70.

Figure 12:
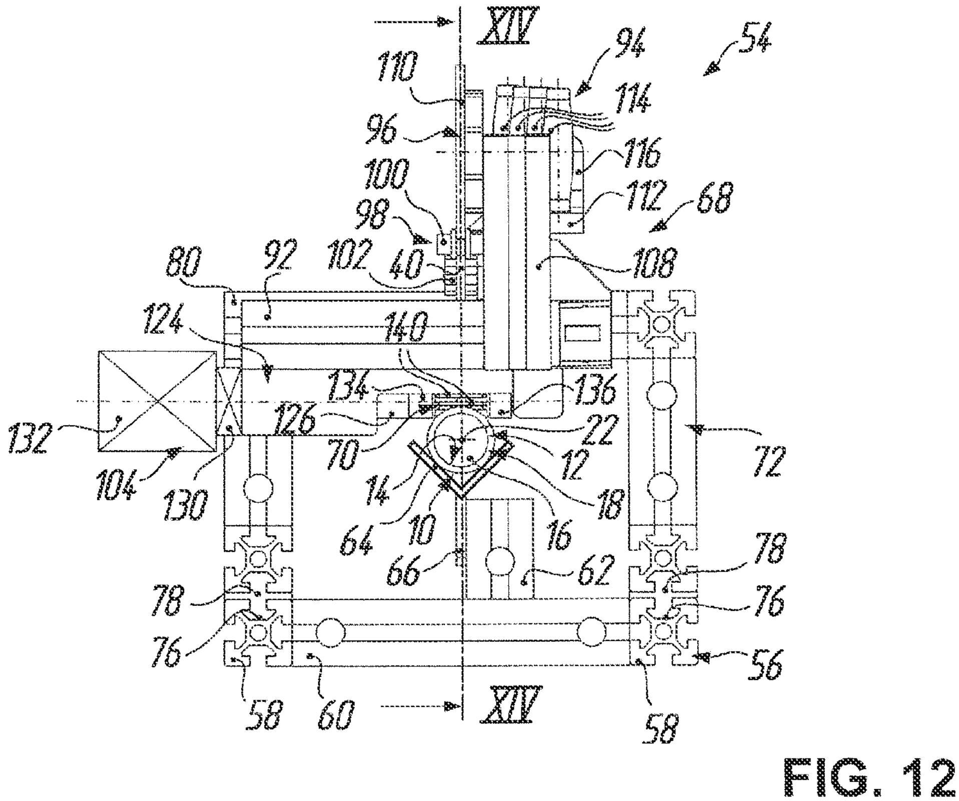
FIG. 12 shows a front view of the device according to FIG. 7, with a viewing direction from the right in FIG. 11.

According to FIGS. 10, 11 and 14 initially the guide roller arrangement 98 is mounted by a mounting profile section 106 at the top on the head part 92 of the applicator arm 82 so that the guide rollers 100, 102 are disposed above the applicator wheel 70 in a position aligned with respect to the applicator wheel 70, as can be clearly seen in FIGS. 12 and 13. The guide rollers 100, 102 are in that case rotatably mounted in cantilever manner on the mounting profile section 106 in a suitable way.

In addition, a roll holder 108, at the free end of which an adhesive strip roll 110 is rotatably mounted and, in particular, similarly in cantilever manner, of the feed device 96 is mounted on the side of the head part 92 and the mounting profile section 106 remote from the pivot axis 84. According to, in particular, FIGS. 12 and 13 the adhesive strip roll 110, which is arranged with the axis of rotation thereof above the guide roller arrangement 98, is similarly disposed in alignment with the guide rollers 100, 102.

Moreover, a spool holder 112, which in the illustrated embodiment carries four spools 114 with electrically conductive threads 30, the spools being rotatably plugged onto parallel axle pins (not illustrated), of the feed device 94 is mounted at the top on the mounting profile section 106. A fastening angle member 116 for an end of a hose 118, the other end of which is secured by a bracket 120 laterally to the mounting profile section 106, is mounted on the end of the spool holder 112 remote from the adhesive strip roll 110. Finally, this bracket 120 also holds a tubelet 122 for the feed, more precisely guidance of the electrically conductive threads 30 to the guide roller arrangement 98.

In this respect it is apparent that the adhesive strip 40 can be unrolled from the adhesive strip roll 110 of the feed device 96 and fed to the guide roller arrangement 98. At the same time electrically conductive threads 30 can be unspooled from the spools 114, collected by way of the hose 118 and—guided through the tubelet 122—fed to the guide roller arrangement 98, where the electrically conductive threads 30 are combined with the adhesive strip 40.

Moreover, a mounting block 124 of the mounting and drive arrangement 104 for the applicator wheel 70 is mounted below the head part 92 of the applicator arm 82. In the illustrated embodiment the mounting block 124 is of two-part construction, with a part which is on the left in FIG. 13 and in which a drive shaft 126 for the applicator wheel 70 is rotatably mounted by way of two roller bearings, and a part which is on the right in FIG. 13 and on which an axle pin 128 for mounting of the applicator wheel 70 is mounted by way of a roller bearing at the wheel side. In addition, a preferably electrically rotary drive 132, which is in driving connection with the applicator wheel 70 by way of the drive shaft 126, is flange-mounted on the side, which is at the left in FIGS. 12 and 13, of the mounting block 124 by way of a mounting flange 130.

Finally, further details with respect to the applicator wheel 70 can be inferred from FIGS. 10 and 12 to 14. Accordingly, the applicator wheel 70 has between two hub sections 134, 136 a plurality—in the illustrated embodiment five (see FIG. 14)—of axle pins 138 uniformly distributed over the circumference. The axle pins 138 each rotatably mount a respective hollow-cylindrical sleeve 140 as pressing body for the electrically conductive thread 30. It can also be inferred from FIG. 13 that the hub section 134, which is at the left in this figure, of the applicator wheel 70 is connected with the drive shaft 126 in the manner of a coupling to be secure against relative rotation, whereas the hub section 136, which is on the right in this figure, of the applicator wheel 70 receives the roller bearing which co-operates with the axle pin 128 in the mounting block 124 of the applicator wheel to provide rotational mounting.

As, in particular, FIGS. 10 and 14 show, the adhesive strip 40 combined with the electrically conductive threads 30 is guided, starting from the guide roller arrangement 98, through a slot-like cut-out 142 in the head part 92 of the applicator arm 82 and in the mounting block 124, which is mounted thereon, to the applicator wheel 70, by way of which the electrically conductive threads 30 are applied and secured under the adhesive strip 40 to the outer side 18 of the hose 10. In that case the applicator wheel 70, the sleeves 140 of which engage in interlocking manner with the profiling 20 of the hose 10, roll along on the hose 10.

It will be apparent that through driving the applicator wheel 70 by the rotary drive 132 not only the electrically contacting application and securing of the electrically conductive threads 30 to the hose 10 thus take place, but also the advance movement between the applicator 68 and the hose 10, which rests on the hose support 64, is generated, in which the applicator carriage 72 as shown in FIGS. 7 to 9 moves over the hose support 64 fixed at the frame 56. At the end, the hose 10, the electrically conductive track 28 of which is through-plated or short-circuited by way of the applied electrically conductive threads 30, can be removed from the hose support 64 by the device 54 before the further making-up of the hose 10 is carried out by possible further cutting of the hose to length and attachment of the hose mounting members 44, 46.

A flexible hose, particularly vacuum cleaner hose, has a wall which by an inner side delimits a cavity for the conveying of media and has at least at an outer side a profiling which as seen in section along a longitudinal axis of the hose has elevations and depressions. At least one electrically conductive track, which extends around the wall and is in electrically contact with at least one electrically conductive thread which electrically connects mutually remote ends of the hose, is provided at the outer side of the wall. The electrically conductive thread, which extends substantially along the longitudinal axis of the hose and transversely to the electrically conductive track, is secured to the outer side of the wall, whereby the hose in the case of use of a comparatively small amount of electrically conductive materials has improved suitability for recycling. In addition, a method for producing such a hose and a device usable for that purpose are proposed.

Other variations and modifications are possible without departing from the scope and spirit of the present invention as defined by the appended claims.

What is claimed is:

1. A flexible hose (10), with a wall (12) which by an inner side (14) delimits a cavity (16) for the conveying of media and has at least at an outer side (18) a profiling (20) which as seen in section along a longitudinal axis (22) of the hose (10) has a wave shape with elevations (24) and depressions (26), wherein provided at the outer side (18) of the wall (12) is at least one electrically conductive track (28) which extends around the wall (12) and is in electrical contact with at least one electrically conductive thread (30) electrically connecting mutually remote ends (32, 34) of the hose (10), characterized in that the electrically conductive thread (30) extending substantially along the longitudinal axis (22) of the hose (10) and transversely to the electrically conductive track (28) is secured to the outer side (18) of the wall (12) and follows the elevations (24) and the depressions (26) of the wave shape of the hose (10).

2. A flexible hose (10) according to claim 1, characterized in that the electrically conductive thread (30) is secured to the outer side (18) of the wall (12) by an adhesive strip (40).

3. A flexible hose (10) according to claim 2, characterized in that the adhesive strip (40) covers the electrically conductive thread (30) to both sides as seen in circumferential direction of the hose (10).

4. A flexible hose (10) according to claim 1, characterized in that the electrically conductive track (28) on the outer side (18) of the wall (12) is formed near to or at the elevations (24) of the profiling (20).

5. A flexible hose (10) according to claim 1, characterized in that the hose (10) is provided at one or both of the mutually remote ends (32, 34) with a hose mounting member (44, 46) of an electrically conductive material.

6. A flexible hose (10) according to claim 1, characterized in that the wall (12) of the hose (10) is formed from a helically wound profile (36), wherein adjacent windings of the profile (36) are media-tightly connected together.

7. A flexible hose (10) according to claim 6, characterized in that the adjacent windings of the profile (36) are media-tightly connected together by a hot-melt adhesive (38).

8. A method of producing a flexible hose (10), particularly according to claim 1, characterized by the following method steps:

a) forming a basic hose having a wall (12) which by an inner side (14) delimits a cavity (16) about a longitudinal axis (22) and has at least at an outer side (18) a profiling (20) which as seen in section has a wave shape with elevations (24) and depressions (26), wherein the wall (12) is formed from an electrically conductive material or at least one electrically conductive track (28) is formed at the outer side (18) of the wall (12) so that the electrically conductive track (28) extends around the wall (12), b) applying at least one electrically conductive thread (30) to the outer side (18) of the wall (12) so that the electrically conductive thread (30) extends substantially along the longitudinal axis (22) and transversely to the electrically conductive track (28) and c) securing the electrically conductive thread (30) to the outer side (18) of the wall (12) so that the electrically conductive thread (30) electrically contacts the electrically conductive track (28).

9. A method of producing a flexible hose (10) according to claim 8, characterized in that in step a) of forming the basic hose initially a profile (36) is extruded from an electrically conductive plastics material or co-extruded from two plastics materials of different electrical conductivity so that the profile (36) comprises at least one electrically conductive track (28), whereupon the profile (36) is helically wound to form the wall (12) of the basic hose, wherein adjacent windings of the profile (36) are media-tightly connected together.

10. A method of producing a flexible hose (10) according to claim 9, characterized in that the adjacent windings of the profile (36) are media-tightly connected together by a hot-melt adhesive (38).

11. A method of producing a flexible hose (10) according to claim 8, characterized in that the steps b) of applying and c) of securing the electrically conductive thread (30) to the outer side (18) of the wall (12) are performed at the same time.

12. A method of producing a flexible hose (10) according to claim 8, characterized in that after the step c) of securing the electrically conductive thread (30) to the outer side (18) of the wall (12) a hose mounting member (44, 46) of an electrically conductive material, which electrically contacts the electrically conductive thread (30), is attached to one or both of the mutually remote ends (32, 34) of the hose (10) cut to length.

13. Device A device (54) for applying an electrically conductive thread (30) to an outer side (18) of a flexible hose (10) according to claim 1, wherein the outer side (18) of the hose (10) has a profiling (20) which as seen in section along a longitudinal axis (22) of the hose (10) has a wave shape with elevations (24) and depressions (26), characterized by an applicator (68) for the electrically conductive thread (30), the applicator having a rotatable applicator wheel (70) which is similar to a stock wheel or cell wheel and at the outer circumference of which the electrically conductive thread (30) can be fed, the applicator wheel being adapted to enter into interlocking engagement with the profiling (20) of the hose (10) placeable in a hose support (64) so that when the applicator wheel (70) is rotating a relative advance movement between hose (10) and applicator (68) takes place, in which the applicator wheel (70) applies the electrically conductive thread (30) to the profiling (20) of the hose (10) along the longitudinal axis (22) of the hose (10) to follow the elevations (24) and depressions (26).

14. Device A device (54) according to claim 13, characterized in that the applicator (68) comprises an applicator arm (82) on which the applicator wheel (70) is rotatably mounted and which is pivotable with respect to the hose support (64) about a selectively fixable pivot axis (84).

15. Device A device (54) according to claim 14, characterized in that the applicator arm (82) together with the applicator wheel (70) and the pivot axis (84) thereof is so arranged with respect to the hose support (64) that a torque about the pivot axis (84) arises in the direction of the hose support (64) and/or that the applicator arm (82) is resiliently biased about its pivot axis (84) in the direction of the hose support (64).

16. Device A device (54) according to claim 13, characterized by a frame (56) on which the hose support (64) is mounted in stationary position, wherein the applicator (68) comprises an applicator carriage (72) which carries the applicator wheel (70) and is guided at the frame (56) to be displaceable along the hose support (64).

17. Device (54) according to claim 13, characterized in that the applicator (68) comprises a feed device (94) for the electrically conductive thread (30) and a feed device (96) for an adhesive strip (40), wherein the electrically conductive thread (30) and the adhesive strip (40) can be fed from the feed devices (94, 96) to a pair of guide rollers (100, 102) which are adapted to combine the thread (30) and adhesive strip (40) before being passed on to the applicator wheel (70).

18. Device A device (54) according to claim 13, characterized in that the applicator wheel (70) has between two hub sections (134, 136) a plurality of axle pins (138) which are distributed uniformly over the circumference and which each rotatably mount a respective hollow-cylindrical sleeve (140) as pressing body for the electrically conductive thread (30).

19. Device A device (54) according to claim 13, characterized in that the applicator wheel (70) is drivably connected with a rotary drive (132).

20. A flexible hose (10) with a wall (12) which by an inner side (14) delimits a cavity (16) for the conveying of media and has at least at an outer side (18) a profiling (20) which as seen in section along a longitudinal axis (22) of the hose (10) has a wave shape with elevations (24) and depressions (26), wherein provided at the outer side (18) of the wall (12) is at least one electrically conductive track (28) which extends around the wall (12) and is in electrical contact with at least one electrically conductive thread (30) electrically connecting mutually remote ends (32, 34) of the hose (10), characterized in that the electrically conductive thread (30) extending substantially along the longitudinal axis (22) of the hose (10) and transversely to the electrically conductive track (28) is secured to the outer side (18) of the wall (12), further characterized in that the electrically conductive thread or the adhesive strip (40) covering the electrically conductive thread (30) is surrounded at the outer side (18) of the wall (12) by a braiding (42) of the hose (10).

21. A flexible hose (10), with a wall (12) which by an inner side (14) delimits a cavity (16) for the conveying of media and has at least at an outer side (18) a profiling (20) which as seen in section along a longitudinal axis (22) of the hose (10) has a wave shape with elevations (24) and depressions (26), wherein provided at the outer side (18) of the wall (12) is at least one electrically conductive track (28) which extends around the wall (12) and is in electrical contact with at least one electrically conductive thread (30) electrically connecting mutually remote ends (32, 34) of the hose (10), characterized in that the electrically conductive thread (30) extending substantially along the longitudinal axis (22) of the hose (10) and transversely to the electrically conductive track (28) is secured to the outer side (18) of the wall (12), the hose (10) is provided at one or both of the mutually remote ends (32, 34) with a hose mounting member (44, 46) of an electrically conductive material further characterized in that the profiling (20) of the hose (10) at the outer side is helical and the end (32) of the hose (10) is screwed by the helical profiling (20) into an associated internally threaded section (48) of the hose mounting member (44), wherein the electrically conductive thread (30) is clamped between the profiling (20) and the internally threaded section (48) with formation of an electrical contact.

22. A flexible hose (10), with a wall (12) which by an inner side (14) delimits a cavity (16) for the conveying of media and has at least at an outer side (18) a profiling (20) which as seen in section along a longitudinal axis (22) of the hose (10) has a wave shape with elevations (24) and depressions (26), wherein provided at the outer side (18) of the wall (12) is at least one electrically conductive track (28) which extends around the wall (12) and is in electrical contact with at least one electrically conductive thread (30) electrically connecting mutually remote ends (32, 34) of the hose (10), characterized in that the electrically conductive thread (30) extending substantially along the longitudinal axis (22) of the hose (10) and transversely to the electrically conductive track (28) is secured to the outer side (18) of the wall (12), the hose (10) is provided at one or both of the mutually remote ends (32, 34) with a hose mounting member (44, 46) of an electrically conductive material further characterized in that the end (34) of the hose (10) is plugged into an associated receiving section (50) of the hose mounting member (46) and glued to the hose mounting member (46) by an electrically conductive adhesive (52), into which the electrically conductive thread (30) extends with formation of an electrical contact.

* * * * *